United States Patent [19]
Hess et al.

[11] Patent Number: 5,812,600
[45] Date of Patent: Sep. 22, 1998

[54] METHOD AND APPARATUS FOR MITIGATING DISTORTION EFFECTS IN THE DETERMINATION OF SIGNAL USABILITY

[75] Inventors: Garry C. Hess, Elgin; Mark J. Marsan, Elmhurst; Mark A. Birchler, Roselle, all of Ill.

[73] Assignee: Motorola, Inc., Schaumburg, Ill.

[21] Appl. No.: 690,291

[22] Filed: Jul. 26, 1996

[51] Int. Cl.$^6$ .............................. H04L 23/02; H04L 5/12
[52] U.S. Cl. ................... 375/261; 375/346; 375/348; 455/226.3
[58] Field of Search ................... 375/254, 261, 375/284, 278, 285, 296, 298, 346, 348; 455/67.3, 226.1, 226.3, 303

[56] References Cited

U.S. PATENT DOCUMENTS

| | | | |
|---|---|---|---|
| 2,974,196 | 3/1961 | Van Duuren | 375/254 |
| 5,105,435 | 4/1992 | Stilwell | 375/254 |
| 5,396,656 | 3/1995 | Jasper et al. | 375/261 |
| 5,406,588 | 4/1995 | Birchler et al. | 375/346 |
| 5,440,582 | 8/1995 | Birchler et al. | 375/346 |
| 5,469,465 | 11/1995 | Birchler et al. | 375/346 |
| 5,652,541 | 7/1997 | Yang et al. | 375/346 |
| 5,659,584 | 8/1997 | Uesugi et al. | 375/346 |

*Primary Examiner*—Chi H. Pham
*Assistant Examiner*—Emmanuel Bayard
*Attorney, Agent, or Firm*—Daniel C. Crilly

[57] ABSTRACT

A communication system (100) employs a method and apparatus for mitigating distortion effects and enhancing signal usability determinations in a receiver (102). The receiver receives a discrete information signal that includes a stream of information symbols. Each information symbol (124) of the stream includes two components: a desired component and an undesired component that includes interference and distortion. The receiver determines an estimate (126) of the desired component of an information symbol and an estimate (130) of the undesired component of the information symbol based on the information symbol itself and its desired component estimate. The undesired component estimate is then scaled by a scaling factor (132) that is derived based on the desired component estimate. An enhanced determination of signal usability (136) for the received symbol is finally determined based on the scaled undesired component estimate (134). In this manner, the enhanced signal usability determination approaches being a function of interference only, substantially exclusive of distortion.

15 Claims, 3 Drawing Sheets

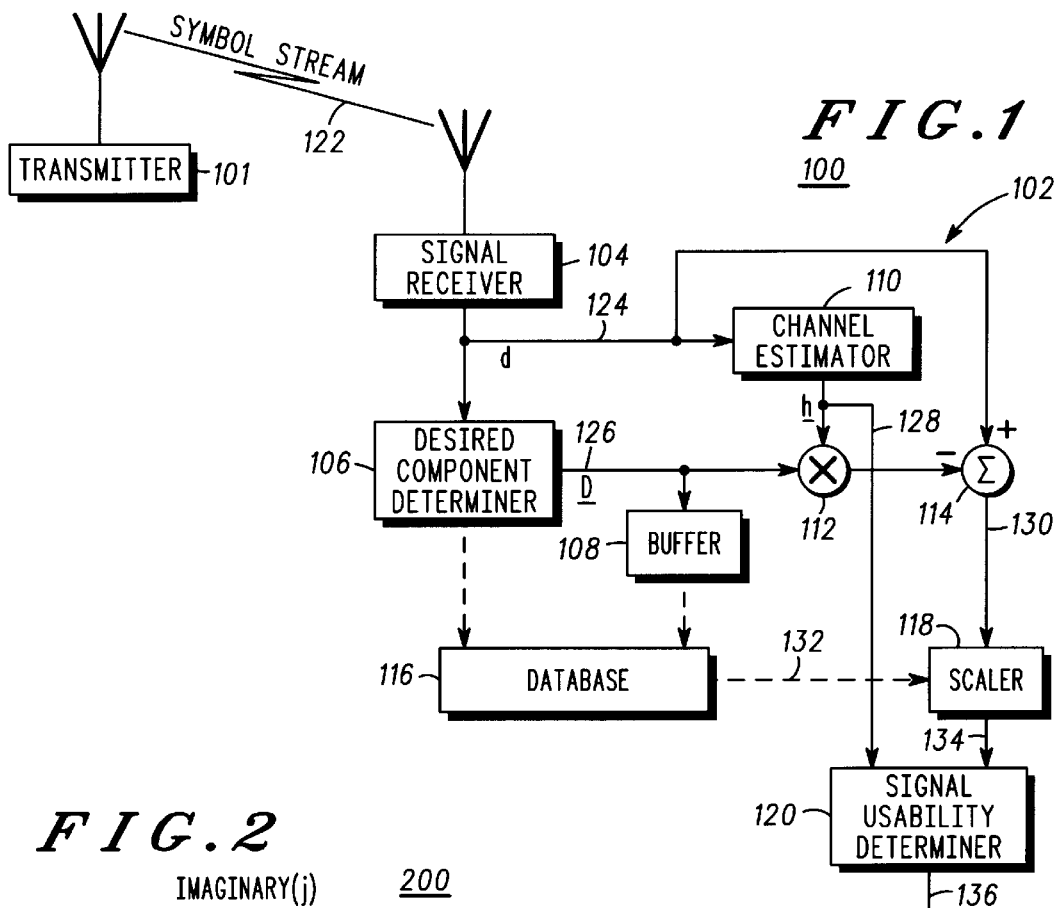
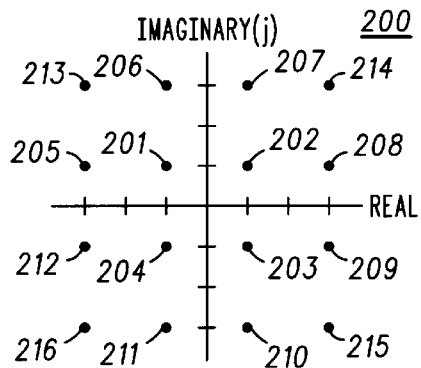
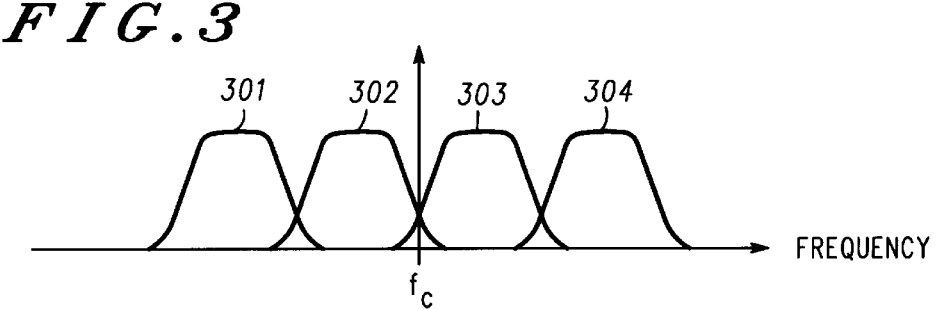

500

700

600

METHOD AND APPARATUS FOR MITIGATING DISTORTION EFFECTS IN THE DETERMINATION OF SIGNAL USABILITY

FIELD OF THE INVENTION

The present invention relates generally to communication systems and, in particular, to a communication system with geographic reuse of communication resources.

BACKGROUND OF THE INVENTION

Communication systems that geographically reuse communication resources are known in the art. These systems allocate a predetermined set of communication resources in one geographic area and reuse the same set of communication resources in one or more geographic areas. This reuse technique improves communication capacity by minimizing the number of communication resources necessary to provide communication service in a large geographic area comprised of several smaller geographic areas.

Two of the most common communication systems which geographically reuse communication resources are cellular and trunked mobile communication systems. In both communication systems, allocation of a communication resource begins when a communication unit requests communication service. Based on resource availability and signal usability, a resource controller assigns the communication resource, such as a frequency channel or a time slot, to the communication unit. A communication, such as a conversation or a facsimile transmission, occurs on the communication resource between the communication unit and another communication unit or between the communication unit and a subscriber to a public service telephone network. The communication continues until completion or an interruption in service occurs. Upon conclusion of the communication, the resource controller retrieves the communication resource, thereby making the communication resource available for another communication.

An important parameter in identifying an acceptable communication resource is signal usability. In a wireless communication system, communication resources are typically radio frequency (RF) channels which occupy predetermined bandwidths. When information signals are transmitted on the RF channels (communication resources), undesired channel effects, such as interference and noise, and distortion of the transmitter and receiver alter the information signals during transmission and reception. Therefore, the information signals received by a receiver in a communication unit, or a base station, are corrupted by the interfering channel and distortion effects. By ascertaining an indication of the interference and noise on available communication resources, the most reliable communication resource may be selected for the communication. This indication is known as signal usability.

In geographic reuse communication systems, signal usability is typically limited by the quantity of co-channel interference present on the RF channel. Co-channel interference occurs when receivers receive unwanted information signals from neighboring communication units, or base stations, transmitting on the same channel as the desired RF channel. For a detailed discussion of a method for determining signal usability based on a ratio of the desired signal (C) to the summed quantity of co-channel interference (I) and noise (N) refer to U.S. Pat. No. 5,440,582, entitled "A Method And Apparatus For Determining Signal Usability" and assigned to Motorola, Inc. While this technology provides many advantages, it does not address the technological concern of dynamic range limitations imposed by transmitter and receiver distortion effects on determined signal usability.

Distortion effects have several causes with one common result, they tend to limit the maximum achievable signal usability indication (C/(I+N)). Distortion effects add to the interference term in the denominator of the carrier to interference plus noise ratio to produce a new indication of signal usability, C/(I+N+D), where D represents the distortion effects produced by both the receiver and the transmitter. Typically, the co-channel interference is much larger than the distortion effects; thus, the distortion effects can be neglected and the indication of signal usability can be obtained by evaluating the carrier to interference plus noise ratio. However, when the co-channel interference becomes small, the distortion effects impact the signal usability indication and prevent a linear correlation between the actual signal usability and the carrier to interference plus noise ratio. Therefore, without acknowledging the effects of distortion, the range of accurate signal usability indications determined from evaluating the carrier to interference plus noise ratio is limited to a maximum value due to the implications of the distortion effects. In a logarithmic representation, the maximum measurable carrier to interference plus noise ratio is typically less than 25 dB due to inherent distortions of present technology.

However, some frequency reuse communication systems require maximum signal usability indications in excess of 30 dB for optimal system operation. In these wide dynamic range systems, estimating distortion effects is critical to obtaining accurate indications of signal usability and enhancing system functionality.

Distortion effects commonly encountered in transmitters and receivers include timing errors in digital receivers, carrier feedthrough, filter distortions, and amplifier nonlinearities. Timing errors result from improper sampling of a received signal and promote intersymbol interference. Carrier feedthrough degrades the desired signal by displacing a portion of the RF carrier energy into the modulated information signal. Filter distortions modify the magnitude and phase of the desired signal due to their inherently variant magnitude and group delay frequency responses. Amplifier nonlinearities, such as intermodulation distortion, introduce unwanted RF energy into the bandwidth of the desired signal.

One approach to correct for the effects of distortion in the determination of signal usability is described in U.S. Pat. No. 5,406,588, entitled "Method And Apparatus For Mitigating Distortion Effects In The Determination Of Signal Usability" and assigned to Motorola, Inc. In this approach, the receiver performing the signal usability determination uses preestablished information about the distortion introduced by the transmitter and receiver to filter and scale the undesired component (i.e., the component containing the interference, noise, and distortion) of the received information symbol and, thereby, mitigate the effects of distortion on the signal usability determination. However, although this approach accounts for the general effects of distortion produced in the transmitter and receiver, it does not completely account for the varying levels of distortion that affect the information signals based on the particular data contained in the information signal. For example, when the information signal includes information symbols corresponding to one or more of the symbol locations in a 16-ary quadrature amplitude modulation (QAM) symbol constellation, the level of distortion introduced by the receiver and transmitter on a particular symbol varies based on the magnitude of the desired component (i.e., the data less the interference, noise, and distortion) of that symbol. Consequently, the general distortion mitigation approach in U.S. Pat. No. 5,406,588 may not mitigate distortion of a received symbol sufficiently enough to achieve a desired signal usability dynamic range. The insufficiency of existing techniques is particularly evident when the magnitude of the received symbol's desired component is large and, therefore, subject to larger levels of distortion during the transmission and reception processes.

Therefore, a need exists for a method and apparatus that mitigates the effects of distortion introduced by a transmitter and receiver based on the data content of transmitted information symbols to further enhance the dynamic range of signal usability determinations.

BRIEF DESCRIPTION OF THE DRAWINGS

FIG. 1 illustrates a block diagram depiction of a communication system that includes a radio transmitter and a radio receiver in accordance with the present invention.

FIG. 2 illustrates a 16-ary quadrature amplitude modulation constellation depiction of information symbols that may be transmitted by the radio transmitter of FIG. 1.

FIG. 3 illustrates received signal subchannels that include streams of information symbols in accordance with the present invention.

FIG. 4 illustrates desired component estimates of information symbols received in the subchannels of FIG. 3 that are stored in a storage device in accordance with the present invention.

DESCRIPTION OF A PREFERRED EMBODIMENT

Figures 5, 7:
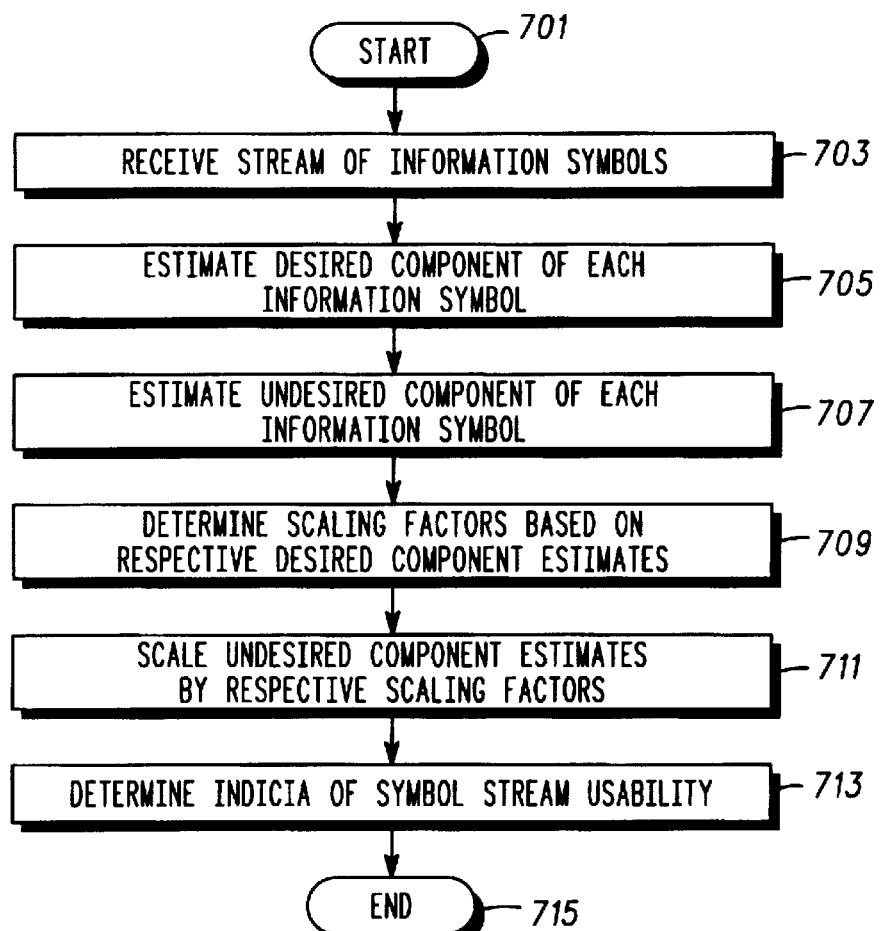
FIG. 5 illustrates a lookup table of preferred scaling factors as a function of desired component estimate position in the constellation of FIG. 2.
FIG. 7 illustrates a logic flow diagram of steps executed to mitigate distortion effects in the determination of signal usability in accordance with an alternative embodiment of the present invention.

Generally, the present invention encompasses a method and apparatus for mitigating distortion effects and enhancing signal usability determinations in a receiver. A receiver receives a discrete information signal that includes a stream of information symbols. Each information symbol of the stream includes two components: a desired component and an undesired component that includes interference and distortion. The receiver determines an estimate of the desired component of an information symbol and an estimate of the undesired component of the information symbol based on the information symbol itself and its desired component estimate. The undesired component estimate is then scaled by a scaling factor that is based on the desired component estimate. An enhanced determination of signal usability for the received symbol is finally determined based on the scaled undesired component estimate. The enhancement of the signal usability determination is achieved by minimizing the effects of distortion present in the undesired component estimate of the received symbol based on a characteristic (e.g., magnitude) of the symbol's desired component estimate. In this manner, the enhanced signal usability determination for each received information symbol approaches being a function of interference only—by virtue of less distortion being present in the undesired component estimate—and, therefore, is more applicable to wide dynamic range communication systems than are existing signal usability determination techniques.

The present invention can be more fully described with reference to FIGS. 1–7. FIG. 1 illustrates a radio transmitter 101 transmitting a symbol stream over a radio frequency (RF) channel 122 to a radio receiver 102 in a communication system 100. The symbol stream is altered throughout its path from the transmitter 101 to the receiver 102 by inherent transmitter distortion, noise and interference in the RF channel 122, and inherent receiver distortion. Thus, each symbol of the resultant altered symbol stream at the input to the receiver's signal receiver 104 includes a desired component and an undesired component, wherein the desired component includes the original unaltered symbol and the undesired component includes the channel interference and noise, and the distortions from the transmitter 101 and the receiver 102, respectively.

FIG. 2 illustrates an exemplary set of predetermined symbol locations 201–216 in a complex symbol space 200 that preferably form the set of possible symbols to be transmitted by the transmitter 101. In particular, FIG. 2 illustrates a 16-ary quadrature amplitude modulation (QAM) constellation of information symbols that may be transmitted by the transmitter 101. Each information symbol or symbol location 201–216 of this constellation is two-dimensional and has a value defined by its position in the complex symbol space 200.

As is known in the art, a signal that includes a stream of discrete information symbols can be transmitted over a communication resource, such as an RF transmission channel 122, and received by a receiver 102. Due to the presence of distortions in the transmitter 101 and receiver 102 and interference, noise, and additional distortion in the transmission channel 122, the received value of each information symbol 201–216 is typically altered.

Excluding the additional distortion in the transmission channel 122, this alteration will typically consist of an approximately zero mean random process superimposed on each information symbol 201–216 of the transmitted stream. Thus, the received values for each information symbol 201–216 appear within a range of values centered about the value of the corresponding transmitted information symbol.

However, due to the various distortions in the transmitter 101 and receiver 102, each symbol 201–216 of the symbol stream may encounter different levels of distortion. For example, in a multiple radio subchannel system, as discussed in U.S. Pat. No. 5,519,730, entitled "Communication Signal Having A Time Domain Pilot Component," and assigned to Motorola, Inc., and shown in FIG. 3, information symbols conveyed in one or more of four radio subchannels 301–304 centered about a carrier frequency ($f_c$) may be corrupted with less distortion than are those conveyed by the other radio subchannels. Additionally, the transmitter and receiver distortions corrupt some information symbol locations more than others dependent upon their positions in the complex symbol space 200. That is, the symbol locations 201–216 in the complex symbol space 200 are subject to varying levels of distortion based on their respective positions in the complex symbol space 200. In the 16-ary QAM constellation depicted in FIG. 2, with reference to the symbol locations 205–212 having a squared magnitude of ten, the symbol locations 213–216 having larger magnitudes than the reference symbol locations 205–212 are subjected to greater levels of distortion by the transmitter 101 and receiver 102; whereas, the symbol locations 201–204 having smaller magnitudes than the reference symbol locations 205–212 are subjected to lower levels of such distortion. Therefore, to enhance the distortion minimization processes of the receiver 102, the present invention applies varying weights to the symbol components containing the distortion (undesired components) based on an estimate of the transmitted symbol's symbol location (desired component).

The receiver 102, which includes the signal receiver 104, a desired component determiner 106, a data buffer 108, a channel estimator 110, a multiplier 112, an undesired component determiner 114, a database 116, a scaler 118 and a signal usability determiner 120, is used to process the altered symbol stream and provide an indicia of symbol stream usability. The signal receiver 104 receives, amplifies, filters, and converts the altered symbol stream to a baseband symbol stream that can be processed by the desired component determiner 106, the undesired component determiner 114, and the channel estimator 110. The signal receiver 104 typically includes an RF front-end, filters, frequency down-converters, analog-to-digital converters, and digital signal processing required to reliably obtain estimates of the symbols in the received symbol stream. In many circumstances, the filters and other components of the signal receiver 104 are the sources of the aforementioned receiver distortion.

Each symbol (d) 124 of the baseband symbol stream includes a baseband representation of the desired and undesired components.

The channel estimator 110 accepts each symbol of the baseband symbol stream, estimates of the gain and phase introduced on each transmitted symbol by the RF channel, and produces channel fading signals (h) 128 that reflects the gain and phase estimates. The desired component determiner 106 also admits each symbol of the baseband symbol stream and estimates its respective desired component. The desired component estimate (D) 126 of any particular received information symbol is preferably the symbol location of the originally transmitted symbol in the complex symbol space 200. Detailed discussions of methods for estimating the effects of the RF channel and determining the desired component estimate 126 are provided in U.S. Pat. Nos. 5,519,730 and 5,440,582, both of which are incorporated herein by reference.

In a preferred embodiment, the desired component estimates 126 of a plurality of received information symbols are stored in the data buffer 108. The data buffer 108 comprises a storage device, such as a random access memory (RAM). Exemplary entries 401–404 in the data buffer 108 are depicted in FIG. 4. The entries 401–404 comprise desired component estimates 126 of four information symbols received in each of the four subchannels 301–304 depicted in FIG. 3 during a predetermined time period (e.g., one millisecond). The desired component estimates 126 stored in the data buffer 108 are denoted Dij, wherein i is the subchannel reference index and j is the information symbol index.

Each desired component estimate 126 is forwarded from the data buffer 108 to the multiplier 112, where the desired component estimate 126 is multiplied with the channel fading signal 128 that corresponds to the baseband information symbol (d) from which the particular desired component estimate 126 was produced. The undesired component determiner 114 receives the baseband information symbol and the output of the multiplier 112 and estimates the baseband symbol's undesired component preferably by subtracting the channel-modified desired component estimate (Dh) from the baseband symbol (d). The undesired component estimate 130, which includes the interference and noise from the RF channel 122 and the receiver and transmitter distortions, is then supplied to the scaler 118.

The scaler 118 scales the undesired component estimate 130 based on a scaling factor 132 stored in the database 116 to produce a scaled undesired component estimate 134. In a preferred embodiment, the database 116 comprises the lookup table 500 depicted in FIG. 5. The lookup table 500 includes three scaling factors 501–503, one for each of three categories of symbol locations in the exemplary complex symbol space 200 of FIG. 2. The first scaling factor 501 (i.e., 1.19) corresponds to the symbol locations 201–204 (+/−1, +/−j) having the smallest magnitude of the symbol locations 201–216 in the set and, therefore, being subject to the lowest level of transmitter and receiver distortion. The second scaling factor 502 (i.e., 1.0) corresponds to the symbol locations 205–212 (+/−1, +/−3j and +/−3, +/−j) having the median magnitude of the symbol locations 201–216 in the set and, therefore, being subject to the median level of transmitter and receiver distortion. The third scaling factor 503 (i.e., 0.375) corresponds to the symbol locations 213–216 (+/−3, +/−3j) having the largest magnitude of the symbol locations 201–216 in the set and, therefore, being subject to the highest level of transmitter and receiver distortion.

The scaling factors 501–503 are preferably determined in the following manner. The symbol locations 205–212 that are subject to the median level of transmitter and receiver distortion are selected as reference locations. Accordingly, the magnitude of any one of the reference symbol locations 205–212 (since all the magnitudes are equal) is determined and selected as a reference value. The reference value is then divided by the magnitudes associated with all other categories of symbol locations to produce reference scaling factors. For example, the reference scaling factor for the first category of symbol locations is determined by forming a ratio of the reference value, which in this particular case is the square root of ten (e.g., |1+j3|), to a magnitude of one of the symbol locations 201–204 in the first category, which in this particular case is the square root of two (e.g., |1+j|). The result of the ratio is the reference scaling factor. Thus, the reference scaling factor for the first category of symbol locations 201–204 (i.e., the inner symbol locations) is the square root of five or approximately 2.24. In a similar manner, the reference scaling factors for the other two categories of symbol locations 205–216 (i.e., middle and outer symbol locations) are determined by forming a ratio of the reference value to a magnitude of one of the symbol locations in each respective category. Thus, in this case, the reference scaling factor for the middle symbol locations 205–212 is 1.0 and the reference scaling factor for the outer symbol locations 213–216 is the square root of 5/9, or 0.74. It should be noted that, as described above, each reference scaling factor is inversely proportional to a magnitude of its respective symbol location (i.e., desired component estimate).

In a preferred embodiment, the reference scaling factor of the middle symbol locations 205–212 constitutes the final scaling factor 502 for the middle symbol locations 205–212 stored in the lookup table 500. However, the reference scaling factors of the other symbol locations 201–204, 213–216 do not constitute the final scaling factors 501, 503 for those symbol locations 201–204, 213–216 stored in the lookup table 500. Rather, the preferred scaling factors 501, 503 for the inner and outer symbol locations comprise values that are less than the corresponding reference scaling factors. Using a scaling factor 503 less than the reference scaling factor is particularly important to mitigate the distortion present when the desired component estimate comprises an outer symbol location 213–216 because the outer symbol locations 213–216 are subject to the greatest level of distortion of the symbol locations 201–216 depicted in FIG. 2. By using a scaling factor less than the reference scaling factor, the present invention attempts to minimize the affects of distortion in the determination of signal usability, particularly for received information symbols having desired components that are estimated as being outer symbol locations 213–216. The scaling factor 503 for the outer symbol locations 213–216 is made less than its corresponding reference scaling factor by either increasing the denominator (e.g., by dividing the reference value by a value larger than the magnitude of an outer symbol location 213–216) or by decreasing the numerator (i.e., reference value) in the ratio formed to produce the reference scaling factor.

In an alternative embodiment, the scaling factors 501–503 may comprise the reference scaling factors for each category of symbol location (desired component estimate). This embodiment permits a larger proportion of the undesired component estimate 130 to be used in the signal usability determination, especially with respect to the outer symbol locations 213–216. Thus, this embodiment might be employed in a system requiring a smaller dynamic range of signal usability determinations than does the preferred embodiment.

In yet another embodiment, the scaling factors 501–503 may be further based on one or more desired component estimates 126 stored in the data buffer 108. For example, the scaling factor of an undesired component estimate 130 corresponding to desired component estimate D11 in FIG. 4 may be based not only on the magnitude of the symbol location represented by D11, but also on the magnitude of the symbol location or locations that represent one or more of the other desired component estimates stored in the buffer 108. Thus, the scaling factor to be applied to one undesired component estimate 130 may be based on the magnitudes of desired component estimates from two or more subchannels 301–304—i.e., the subchannel containing the undesired component estimate's corresponding desired component and at least one other subchannel. By obtaining the scaling factors in this manner, distortion variation across subchannels 301–304 can be accounted for and mitigated in the determination of signal usability.

In the preferred embodiment, upon request of the scaler 118, the database 116 receives the desired component estimate 126 of the information symbol used to produce the particular undesired component estimate 130 that is to be scaled, selects the appropriate scaling factor corresponding to the desired component estimate, and provides the scaling factor 132 to the scaler 118. For example, when the desired component estimate 126 corresponding to the undesired component estimate 130 to be scaled is one of the outer symbol locations 213–216 (e.g., −3, j3), the database 116 provides the scaling factor 0.375 to the scaler 118 in response to the request.

Upon receiving the scaling factor 132, the scaler 118 scales (i.e., multiplies) the undesired component estimate 130 by the scaling factor 132 and provides the scaled undesired component estimate 134 to the signal usability determiner 120. The signal usability determiner 120 determines an indicia (e.g., C/(I+N)) of the signal usability 136 of the received information symbol 124 based on the information symbol's scaled undesired component estimate 134 and the channel fading signal 128 preferably in accordance with the technique described in U.S. Pat. No. 5,440,582. The signal usability 136 is then provided to the handoff processing algorithm in accordance with known techniques. In the preferred embodiment, the above-described process is repeated for each received information symbol to determine the signal usability of each received information symbol and the received symbol stream.

As described above, the present invention provides a technique for mitigating the effects of distortion in the determination of signal usability as a function of the data symbols transmitted. Existing approaches to determining signal usability either do not account for the distortion introduced by the transmitter and receiver or reduce the distortion independent of the data symbol transmitted. In the latter approach, the receiver applies the same filtering or scaling to all undesired components of received information symbols regardless of the data symbol actually transmitted. By contrast, the present invention scales the undesired components of the received information symbols differently based on the estimates of the desired components of the received symbols. In this manner, the present invention reduces the varying levels of distortion affecting the various individual or groups of transmitted information symbols during the signal usability determination. By scaling the undesired component estimates based on the estimates of the transmitted data symbols (desired components), the present invention permits a greater dynamic range of signal usability determinations that are independent of the magnitudes of the transmitted data symbols.

Figure 6:
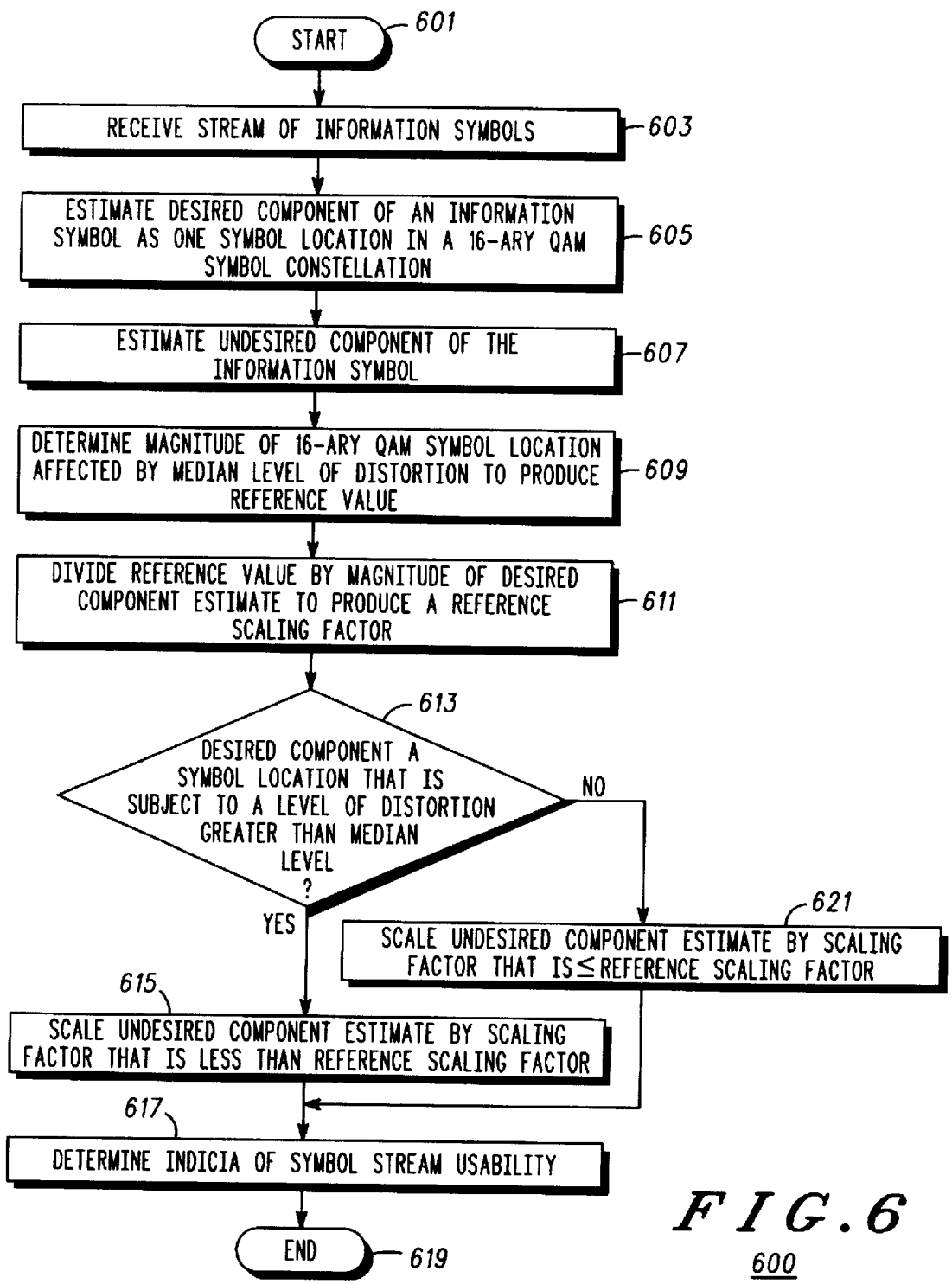
FIG. 6 illustrates a logic flow diagram of steps executed to mitigate distortion effects in the determination of signal usability in accordance with a preferred embodiment of the present invention.

FIG. 6 illustrates a logic flow diagram 600 of steps executed to mitigate distortion effects in the determination of signal usability in accordance with a preferred embodiment of the present invention. The logic flow begins (601) when a receiver receives (603) a stream of information symbols, wherein each information symbol includes a desired component containing the transmitted data and an undesired component containing interference, noise, and distortion. The receiver then estimates (605) the desired component of one of the received information symbols as a symbol location in a 16-ary QAM symbol constellation. The receiver also estimates (607) the undesired component of the received information symbol by subtracting the channel-compensated desired component estimate from the received information symbol.

Either prior to or after estimating both the desired and undesired components of a particular received information symbol, the receiver determines (609) a magnitude of a 16-ary QAM symbol location that is affected by a median level of distortion (e.g., symbol location (1, 3j)) to produce a reference value. The receiver divides (611) the reference value by the magnitude of the desired component estimate to produce a reference scaling factor. The production of the reference scaling factor may be accomplished during real-time processing of the received information symbol or, as in the preferred embodiment, prior to processing of the received information symbol. That is, in the preferred embodiment, the reference scaling factors for all symbol locations in the 16-ary QAM symbol constellation are computed and stored in a database prior to reception of the stream of information symbols.

Once the reference scaling factor, the desired component estimate, and the undesired component estimate have all been determined, the receiver determines (613) whether the desired component estimate represents a symbol location that is subject to a level of distortion that is greater than the median level of distortion. In the preferred embodiment, the receiver determines whether the desired component estimate is an outer symbol location in the 16-ary QAM symbol constellation. When the desired component estimate does represent a symbol location that is subject to a level of distortion that is greater than the median level of distortion, the receiver scales (615) the undesired component estimate by a scaling factor that is less than the reference scaling factor. For example, as described above with regard to FIGS. 1–5, the reference scaling factor for the outer symbol locations in the 16-ary QAM symbol constellation is 0.74; whereas, the preferred scaling factor for the outer symbol locations is 0.375.

When the desired component estimate does not represent a symbol location that is subject to a level of distortion that is greater than the median level of distortion, the receiver scales (621) the undesired component estimate by a scaling factor that is less than or equal to the reference scaling factor. For example, as described above with regard to FIGS. 1–5, the reference scaling factor for the middle symbol locations in the 16-ary QAM symbol constellation is 1.0 and the preferred scaling factor for the middle symbol locations is also 1.0. However, the reference scaling factor for the inner symbol locations in the 16-ary QAM symbol constellation is 2.23; whereas, the preferred scaling factor for the inner symbol locations is 1.19. In the preferred embodiment, reduction of the scaling factor applied to the outer symbol locations below its corresponding reference scaling factor is more important than reduction of the scaling factor applied to the inner symbol locations below its corresponding reference scaling factor because the higher level of distortion present in the undesired component of a received outer symbol location has a greater negative impact on the determination of symbol usability than does the lower level of distortion present in the undesired component of a received inner symbol location.

Upon scaling the undesired component estimate, the receiver determines (617) an indicia of symbol stream usability based on the scaled undesired component estimate as described in U.S. Pat. No. 5,440,582 and the logic flow ends (619).

FIG. 7 illustrates a logic flow diagram 700 of steps executed to mitigate distortion effects in the determination of signal usability in accordance with an alternative embodiment of the present invention. The logic flow begins (701) when a receiver receives (703) a stream of information symbols, wherein each information symbol includes a desired component containing the transmitted data and an undesired component containing interference, noise, and distortion. The receiver then estimates (705) the desired component of each of the received information symbols (e.g., as symbol locations in a complex symbol space). The receiver also estimates (707) the undesired component of each received information symbol by subtracting the corresponding channel-compensated desired component estimate from the received information symbol.

Upon determining the desired and undesired component estimates of each information symbol in the received symbol stream, the receiver determines (709) the scaling factors for the undesired component estimates based on the respective desired component estimates. This determination may be accomplished through real-time computations or through the querying of a database, both of which were described above. The receiver then scales (711) the undesired component estimates by their respective scaling factors and determines (713) an indicia of symbol stream usability based on the scaled undesired component estimates (e.g., using the method described in U.S. Pat. No. 5,440,582), and the logic flow ends (715).

The present invention encompasses a method and apparatus for mitigating distortion effects and enhancing signal usability determinations in a receiver. With the present invention, the dynamic range limitation on signal usability determinations, due to the presence of distortion in undesired components of a received symbol stream, is significantly improved such that maximum signal usability indications in excess of 30 dB are achievable regardless of the data transmitted. Previous attempts to measure and compute true signal usability, C/(I+N), by mitigating the distortion present in the denominator (I+N+distortion) of the computation have fallen short of their goal because such attempts do not take into account the data dependency of the distortion (i.e., that certain transmitted data symbols are subject to higher levels of distortion than are other transmitted data symbols). The present invention increases the dynamic range of the signal usability indication for all transmitted data symbols by significantly reducing the power of the distortion term as a function of the data transmitted, thus enabling a greater maximum value of the measured carrier to interference plus noise ratio to be attained for all transmitted data symbols. In addition, the present invention improves the consistency, or variance, of signal usability determinations by mitigating the effects of distortion as a function of desired component magnitude.

While the present invention has been particularly shown and described with reference to particular embodiments thereof, it will be understood by those skilled in the art that various changes in form and details may be made therein without departing from the spirit and scope of the present invention.

We claim:

1. A method for mitigating distortion effects to enhance signal usability determination, the method comprising the steps of:

receiving a stream of information symbols to produce a symbol stream, each information symbol of the symbol stream including a desired component and an undesired component, the undesired component of each information symbol including distortion;

estimating the desired component of a first information symbol of the symbol stream to produce a desired component estimate, wherein the first information symbol is an information symbol received in a first radio subchannel of a plurality of radio subchannels;

estimating the undesired component of the first information symbol based on the first information symbol and the desired component estimate to produce an undesired component estimate;

scaling the undesired component estimate by a scaling factor that is based on the desired component estimate and a second information symbol of the symbol stream to produce a scaled undesired component estimate, wherein the second information symbol is an information symbol received in a second radio subchannel of the plurality of radio subchannels; and determining an indicia of symbol stream usability based on the scaled undesired component estimate.

2. The method of claim 1, further comprising the step of storing desired component estimates of a plurality of information symbols of the stream of information symbols received during a predetermined time period, the plurality of information symbols including the first information symbol and the second information symbol, and wherein the step of scaling comprises the step of scaling the undesired component estimate by a scaling factor that is based on the desired component estimate and a desired component estimate of the second information symbol.

3. The method of claim 1, wherein the scaling factor is inversely proportional to a magnitude of the desired component estimate.

4. A method for mitigating distortion effects to enhance signal usability determination, the method comprising the steps of:
   receiving a stream of information symbols to produce a symbol stream, each information symbol of the symbol stream including a desired component and an undesired component, the undesired component of each information symbol including distortion;
   estimating the desired component of a first information symbol of the symbol stream to produce a desired component estimate;
   estimating the undesired component of the first information symbol based on the first information symbol and the desired component estimate to produce an undesired component estimate;
   dividing a reference value by a magnitude of the desired component estimate to produce a scaling factor;
   scaling the undesired component estimate by the scaling factor; and
   determining an indicia of symbol stream usability based on the scaled undesired component estimate.

5. The method of claim 4, wherein the desired component of each information symbol of the symbol stream is one symbol location of a set of predetermined symbol locations in a complex symbol space, wherein the set of predetermined symbol locations are subjected to varying levels of distortion based on respective positions in the complex symbol space, and wherein the step of scaling further comprises the step of:
   determining a magnitude of a symbol location of the set of predetermined symbol locations that is affected by a median level of distortion of the varying levels of distortion to produce the reference value.

6. The method of claim 5, wherein the step of dividing comprises the step of dividing the reference value by at least the magnitude of the desired component estimate when the desired component is a symbol location of the set of predetermined symbol locations that is subjected to a greater level of distortion than the median level of distortion.

7. The method of claim 6, wherein the set of predetermined symbol locations constitute symbol locations in a 16-ary quadrature amplitude modulation symbol constellation and wherein the desired component is a symbol location having a greatest magnitude of the symbol locations in the 16-ary quadrature amplitude modulation symbol constellation.

8. A method for mitigating distortion effects to enhance signal usability determination, the method comprising the steps of:
   receiving a stream of information symbols to produce a symbol stream, each information symbol of the symbol stream including a desired component and an undesired component, the undesired component of each information symbol including distortion, wherein the desired component of each information symbol of the symbol stream is one symbol location of a set of predetermined symbol locations in a complex symbol space, and wherein the set of predetermined symbol locations are subjected to varying levels of distortion based on respective positions in the complex symbol space;
   estimating the desired component of a first information symbol of the symbol stream to produce a desired component estimate;
   estimating the undesired component of the first information symbol based on the first information symbol and the desired component estimate to produce an undesired component estimate;
   determining a magnitude of a symbol location of the set of predetermined symbol locations that is affected by a median level of distortion of the varying levels of distortion to produce a reference value;
   dividing the reference value by a magnitude of the desired component estimate to produce a reference scaling factor;
   scaling the undesired component estimate by a scaling factor that is less than the reference scaling factor when the desired component is a symbol location of the set of predetermined symbol locations that is subjected to a greater level of distortion than the median level of distortion; and
   determining an indicia of symbol stream usability based on the scaled undesired component estimate.

9. A method for mitigating distortion effects to enhance signal usability determination, the method comprising the steps of:
   receiving a stream of information symbols to produce a symbol stream, each information symbol of the symbol stream including a desired component and an undesired component, the undesired component of each information symbol including distortion, the desired component of each information symbol being one symbol location of a set of predetermined symbol locations in a complex symbol space, wherein the set of predetermined symbol locations are subjected to varying levels of distortion based on respective positions in the complex symbol space;
   estimating the desired component of a first information symbol of the symbol stream to produce a desired component estimate;
   estimating the undesired component of the first information symbol based on the first information symbol and the desired component estimate to produce an undesired component estimate;
   determining a magnitude of a symbol location of the set of predetermined symbol locations that is affected by a median level of distortion of the varying levels of distortion to produce a reference value;
   dividing the reference value by a magnitude of the desired component estimate to produce a reference scaling factor;
   determining whether the desired component is a symbol location of the set of predetermined symbol locations that is subjected to a greater level of distortion than the median level of distortion;
   scaling the undesired component estimate by a scaling factor that is less than the reference scaling factor to produce a scaled undesired component estimate when the desired component is a symbol location of the set of predetermined symbol locations that is subjected to a greater level of distortion than the median level of distortion; and
   determining an indicia of symbol stream usability based on the scaled undesired component estimate.

10. The method of claim 9, wherein the set of predetermined symbol locations constitute symbol locations in a 16-ary quadrature amplitude modulation symbol constellation and wherein the desired component is a symbol location having a greatest magnitude of the symbol locations in the 16-ary quadrature amplitude modulation symbol constellation.

11. An apparatus comprising:

a signal receiver that receives a stream of information symbols to produce a symbol stream, each information symbol of the symbol stream including a desired component and an undesired component, the undesired component of each information symbol including distortion;

a desired component determiner, coupled to the signal receiver, that estimates the desired component of a first information symbol of the symbol stream to produce a desired component estimate;

an undesired component determiner, coupled to the desired component determiner and the signal receiver, that estimates the undesired component of the first information symbol based on the first information symbol and the desired component estimate to produce an undesired component estimate;

a scaler, coupled to the desired component determiner and the undesired component determiner, that scales the undesired component estimate by a scaling factor that is based on the desired component estimate to produce a scaled undesired component estimate, wherein the scaling factor represents a result of a ratio of a reference value to a magnitude of the desired component estimate;

a signal usability determiner, coupled to the scaler, that determines an indicia of symbol stream usability based on the scaled undesired component estimate.

12. The apparatus of claim 11, further comprising a database, coupled between the desired component determiner and the scaler, that stores at least one scaling factor used by the scaler to scale the undesired component estimate.

13. The apparatus of claim 12, wherein the desired component of each information symbol of the symbol stream is one symbol location of a set of predetermined symbol locations in a complex symbol space, wherein the set of predetermined symbol locations are subjected to varying levels of distortion based on respective positions in the complex symbol space, and wherein the at least one scaling factor is real-valued.

14. The apparatus of claim 12, wherein the desired component of each information symbol of the symbol stream is one symbol location of a set of predetermined symbol locations in a complex symbol space, wherein the set of predetermined symbol locations are subjected to varying levels of distortion based on respective positions in the complex symbol space, and wherein when the desired component is a symbol location of the set of predetermined symbol locations that is subjected to a greater level of distortion than a median level of distortion of the varying levels of distortion, the reference value is a magnitude of a symbol location of the set of predetermined symbol locations that is affected by the median level of distortion.

15. The apparatus of claim 12, further comprising a storage device, coupled to the desired component determiner, the undesired component determiner, and the database, that stores desired component estimates of a plurality of information symbols of the stream of information symbols, the plurality of information symbols including the first information symbol and the desired component estimates being used to produce the at least one scaling factor.

* * * * *